US010552900B2

(12) United States Patent
Van Vaerenbergh

(10) Patent No.: US 10,552,900 B2
(45) Date of Patent: Feb. 4, 2020

(54) ASSET INVENTORY SYSTEM

(71) Applicant: Euroclear SA/NV, Brussels (BE)

(72) Inventor: Bruno Van Vaerenbergh, Brussels (BE)

(73) Assignee: Euroclear SA/NV (BE)

( * ) Notice: Subject to any disclaimer, the term of this patent is extended or adjusted under 35 U.S.C. 154(b) by 1561 days.

(21) Appl. No.: 14/318,043

(22) Filed: Jun. 27, 2014

(65) Prior Publication Data
US 2015/0006347 A1    Jan. 1, 2015

Related U.S. Application Data

(60) Provisional application No. 61/840,285, filed on Jun. 27, 2013.

(51) Int. Cl.
*G06Q 40/00* (2012.01)
(52) U.S. Cl.
CPC .................... *G06Q 40/00* (2013.01)
(58) Field of Classification Search
None
See application file for complete search history.

(56) References Cited

U.S. PATENT DOCUMENTS

| | | | |
|---|---|---|---|
| 6,490,575 B1 | 12/2002 | Berstis | |
| 7,640,236 B1 | 12/2009 | Pogue | |
| 7,792,812 B1 | 9/2010 | Carr | |
| 8,024,211 B1 * | 9/2011 | Cohen | G06Q 10/06 705/7.14 |
| 2001/0037333 A1 | 11/2001 | Nishimura | |
| 2002/0128946 A1 | 9/2002 | Chehade et al. | |
| 2005/0075999 A1 | 4/2005 | Kojima et al. | |
| 2005/0090924 A1 * | 4/2005 | Hsu | G05B 19/4184 700/112 |
| 2006/0206400 A1 | 9/2006 | Usui | |

(Continued)

FOREIGN PATENT DOCUMENTS

| | | |
|---|---|---|
| EP | 2096564 A1 | 9/2009 |
| JP | H06243170 A | 9/1994 |

(Continued)

OTHER PUBLICATIONS

International Search Report for Application No. PCT/IB14/01229 dated Dec. 17, 12015.

(Continued)

*Primary Examiner* — Usmaan Saeed
*Assistant Examiner* — Katriel Y Chiu
(74) *Attorney, Agent, or Firm* — Lerner, David, Littenberg, Krumholz & Mentlik, LLP

(57) ABSTRACT

Aspects of the invention relate to a computer-implemented method of improving the efficiency of an electronic collateralisation search engine that uses assets distributed on one or more remotely-located asset depositories. The method comprises selecting from a database of asset records of the remotely-located assets of a collateral giver, a subset of asset records having asset characteristics that satisfy a collateral giver's one or more predefined threshold criteria. Restricting a received search of collateral giver's asset records, which match a collateral receiver's query, to the subset of collateral giver's asset records.

16 Claims, 9 Drawing Sheets

(56) References Cited

U.S. PATENT DOCUMENTS

| | | | |
|---|---|---|---|
| 2006/0265259 A1* | 11/2006 | Diana | G06Q 30/08 |
| | | | 705/35 |
| 2007/0100724 A1 | 5/2007 | Hollas et al. | |
| 2007/0130131 A1 | 6/2007 | Porter et al. | |
| 2007/0276744 A1 | 11/2007 | Burke | |
| 2008/0215480 A1* | 9/2008 | Mordecai | G06Q 20/10 |
| | | | 705/38 |
| 2010/0174624 A1* | 7/2010 | Nasser | G06Q 10/00 |
| | | | 705/28 |
| 2010/0318451 A1 | 12/2010 | Niccolini et al. | |
| 2011/0191233 A1* | 8/2011 | Russo | G06Q 40/04 |
| | | | 705/37 |
| 2012/0317016 A1* | 12/2012 | Hughes | G06Q 40/025 |
| | | | 705/38 |
| 2013/0297399 A1* | 11/2013 | Brown | G06Q 40/04 |
| | | | 705/14.34 |
| 2014/0032533 A1* | 1/2014 | Hersans | G06F 16/29 |
| | | | 707/722 |
| 2014/0149342 A1 | 5/2014 | Petit et al. | |

FOREIGN PATENT DOCUMENTS

| | | |
|---|---|---|
| JP | H113373 A | 1/1999 |
| JP | 2000207402 A | 7/2000 |
| JP | 2001331654 A | 11/2001 |
| JP | 2002007399 A | 1/2002 |
| JP | 2002325111 A | 11/2002 |
| JP | 2003044679 A | 2/2003 |
| JP | 2004528622 A | 9/2004 |
| JP | 2006277451 A | 10/2006 |
| JP | 2007173889 A | 7/2007 |
| JP | 2010165170 A | 7/2010 |
| JP | 2010238167 A | 10/2010 |
| JP | 2012221040 A | 11/2012 |
| WO | 2007087594 A2 | 8/2007 |

OTHER PUBLICATIONS

Supplementary European Search Report for Application No. EP14818227 dated Nov. 29, 2016.

* cited by examiner

ASSET INVENTORY SYSTEM

FIELD OF THE INVENTION

The present invention relates to resource allocation in information data systems. More particularly but not exclusively, the invention provides a system and a method to dynamically allocate available resources for database management and for use in subsequent use in data transactions such as electronic tri-party repo transactions and electronic collateralisation.

BACKGROUND

Information systems relate to complementary networks of hardware and software. In such systems, resources comprised in one network, for example data resources, are shared with other adjacent networks, where the resources are utilised in subsequent actions. Often, prior to the execution of any subsequent action, a decision action is carried out to identify available resources, which are to form the basis for any subsequent actions. In order to ensure correct and error free operation of such systems, it is necessary that the decision action is taken on the basis of the correct and most recent state of a resource, which varies in time. Typically, the state of the resource is defined and updated manually. This ensures that available resources are known to the system, and that the decision action is carried out on the current resource state. Manual updating of resource states may be suitable in small and relatively simple information systems, where resource states are not subject to significant fluctuations over short periods of time and the number of different adjacent networks sharing the resources is minimal. Manual updating is less suitable in larger systems, or in systems where resource states may be subject to significant fluctuations over short periods of time, as this places a significant burden on a human operator and leads to bottlenecks forming at the updating process, which leads to delays in the accurate recording of a resource's state. Also, as the number of different adjacent networks increases the likelihood that the resource state will change in a short period of time is increased. As a result of these delays often the actual state of a resource becomes disassociated from the recorded state of the resource, which in turn can have detrimental knock-on effects on any subsequent decision action executed on the basis of inaccurate out-of-date resource status data.

One way the above problem is mitigated in the prior art is to limit the potential for changes of state of the resource, by assigning and making resources available only for use in specific actions. Once assigned for use in a specific action, the resource may no longer be available by other networks for different actions. This significantly reduces the sources of resource status fluctuations. However, this solution is undesirable in that it significantly limits the flexibility of the information system and its utility to a large system with many adjacent networks, and results in stagnant resources. In other words, once a resource has been allocated for use in a specific action it cannot be used for other actions, even when the resource isn't subsequently used for the allocated action, in which case the resource stagnates. For example, a decision action may identify and make a resource available for use in a subsequent action on the basis of resource status. If the resource is not subsequently used for the allocated action, then the resource remains unused and stagnates. This lack of flexibility disadvantageously results in an inefficient use of available system resources and also reduces the concurrency of the system by reducing shared resources.

The above described shortcomings of prior art information systems may be considered with reference to a real world example, with reference to FIG. 1. It is to be appreciated that the problem and its subsequent solution are not limited to the field of the example described below (namely, the financial industry), which is only provided for illustrative purposes.

FIG. 1 is a schematic illustration of an information system 1 used in the financial industry, and specifically of the type used in an electronic tri-party collateralisation system, arranged to carry out tri-party repurchase (repo) transactions. In such examples, the resources relate to financial assets, such as properties, securities, bonds etc. By way of background, in an electronic repo transaction (i.e. a repo transaction implemented using an information system), assets held by a first party using a first terminal 3, are used as collateral to securitise a loan from a second party using a second terminal 5. In such transactions the first party is traditionally referred to as a collateral giver (CG), and the second party is traditionally referred to as a collateral receiver (CR). Typically, the repo transaction has a finite time duration mutually agreed between the CG and the CR, and comprises an agreed start date and an agreed end date. Within the agreed time duration, and at the latest by the agreed end date, the CG must repay the loan amount in addition to any agreed interest. Once the loan amount has been repaid, the collateralized assets are returned by the CR to the CG—this step is commonly referred to as a reverse repo transaction. The terms of the repo transaction are agreed by the first and second parties prior to carrying out the repo transaction. The terms of the repo transaction typically define the start date and the end date of the transaction, the amount of the loan, any applicable interest, and the characteristics of assets that the second party (the CR) is willing to accept as collateral, in addition to the characteristics of assets that the first party (the CG) is willing to offer as collateral. The characteristics of qualifying assets may relate, for example to any one of the following non-limiting characteristics: asset type (e.g. bond, government bond, security etc.), asset issuer rating, underlying currency, country of origin, whether the asset is part of an index, and liquidity.

The CG's assets are often held in multiple different asset depositories 7, 9, 11, 13. Each depository may relate to a different bank, securities holding company, and/or any other entity that maintains assets. The different asset depositories 7, 9, 11, 13 may be located in different geographical territories. Each depository 7, 9, 11, 13 comprises a server 15, 17, 19, 21 and an operatively connected asset database 23, 25, 27, 29. The asset database 23, 25, 27, 29 comprises a database of all the assets associated with a particular user held by the specific depository.

In order to execute an electronic collateralisation transaction, during an initial enrolment process the CG, from the first terminal 3, nominates the assets that the CG is willing to make available for use in a subsequent repo transaction. The nominated assets are subsequently transferred from the relevant asset depositories 7, 9, 11, 13 to a transaction agent 31, via a shared communication network 33, which may relate to a wide area network such as the internet, a private network, or any other communication network.

The transaction agent system 31 (the agent) comprises an asset depository 34 operatively connected to a server 35, and to a collateralisation search engine 37. The nominated assets are stored in the asset depository 34, and define a pool of assets that the CG has made available for use in repo transactions. The CG, and the CR both provide their collateralisation requirements to the collateralisation search engine 37. For example, the CG defines the characteristics of assets that the CG is willing to offer for use as collateral in the transaction with the CR, and forwards the asset characteristics from the first terminal 3 to the collateralisation search engine 37.

Similarly, the CR defines the characteristics of assets that the CR is willing to accept as collateral for a loan, and forwards the characteristics to the collateralisation search engine 37 from the second terminal 5. Both sets of asset characteristics are received by the collateralisation search engine 37, and are used to generate an aggregated search query, which satisfies both the CR's and the CG's provided asset characteristics. For illustrative purposes consider an example where the CG selects the following asset characteristics:

Asset Type: Stock
Minimum Credit Rating (S&P/Fitch Rating): CCC
Maximum Credit Rating (S&P/Fitch Rating): AA
Minimum number of different stocks required: 3

Similarly, the CR also defines the minimum characteristics that must be satisfied by the assets that the CR is willing to accept as collateral:

Asset Type: Bonds, Stock
Minimum Credit Rating (S&P/Fitch Rating): A+
Maximum Credit Rating (S&P/Fitch Rating): No maximum Upon receiving both the CG's and CR's collateralisation requirements, the collateralisation search engine reviews the provided asset characteristics and generates an aggregated search query that satisfied both the CG's and the CR's provided asset characteristics. In this example, the CG's provided collateralisation requirements indicate that the CG is only willing to offer stocks as collateral, that have a minimum of a CCC credit rating and a maximum of AA credit rating. Furthermore, the CG has indicated that a minimum of three different stocks must be selected for use as collateral. Similarly, the CR has indicated that they are willing to accept bonds and/or stocks as collateral for the loan, that have a minimum of an A+ credit rating. The CR has not indicated any maximum credit rating that must be satisfied.

On the basis of the provided asset characteristics, the collateralisation search engine 37 generates an aggregated query which satisfies both the CR's and CG's provided collateralisation requirements. In this instance, the aggregated query will require the following asset characteristics be satisfied:

Asset Type: Stock
Minimum Credit Rating (S&P/Fitch Rating): A+
Maximum Credit Rating (S&P/Fitch Rating): AA
Minimum number of different stocks required: 3

The collateralisation search engine 37 subsequently executes the aggregated search query on the asset depository 34. Assets comprised in the asset depository 34 that satisfy the aggregated search query, and thus by extension also satisfy the terms of the agreed repo transaction, qualify to be selected by the collateralisation search engine 37 for use as collateral. A subset of the qualifying assets is selected which have a requisite value matching that required for the collateralisation. Only assets comprised in the agent's asset depository 34 are queried by the collateralisation search engine 37, for compliance with the aggregated search query and hence for compliance with the repo transaction criteria. Whilst assets are held in the agent's asset depository 34 they cannot be used in other unrelated actions. This inevitably leads to an inefficient use of assets, since many assets, including those assets that do not satisfy the aggregated search criteria and assets that satisfy the aggregated search criteria (qualifying assets) but which are not selected, will remain inactive in the agent's asset depository 34. In other words, once assets have been transferred to the agent's asset depository 34 the can only be used for subsequent tri-party repo transactions managed by the agent 31—they cannot be used in other unrelated actions.

One way of mitigating for this shortcoming is to maintain a mirrored asset database (not shown) in place of the asset depository 34. The mirrored asset database maintains a record of the assets and their associated statuses that the CG has nominated for use in subsequent repo transactions. As the status of an asset changes, this information is relayed to the agent 31 by the relevant asset depository 7, 9, 11, 13, such that the mirrored asset database may be updated accordingly. Additionally, since in this case the assets aren't physically held by the agent 31, they can be used in alternative actions when they are not selected for use as collateral in a subsequent repo transaction. However, a shortcoming of this solution is that the asset status held by the agent must be maintained in real time, to ensure that the collateralisation search engine 37 selects assets for use as collateral on the basis of up-to-date status information. Asset status information is time dependent and can fluctuate significantly over a period of time, in particular when the asset is available for use in alternative actions. To ensure that asset status information is up-to-date at the agent's mirrored asset database, asset status data messages are forwarded to the agent 31 from the relevant asset depository 7, 9, 11, 13. In practice, this means that the agent 31 is often inundated with very large numbers of status update data messages for processing. Often, the volume of received status updates is so large that it is not possible for the agent's server 35 to process each received status message in real time. Instead, status messages are queued in a memory buffer (not shown) for subsequent processing once server processing resources become available. As a result, it is common for a discontinuity to arise between the actual asset status as held by the relevant asset depository 7, 9, 11, 13, and the recorded asset status held by the agent 31 in the mirrored asset database. This can have knock-on effects for the collateralisation search engine 37 and the accuracy of the aggregated search results, due to assets being selected for use as collateral on the basis of erroneous status data. For example, if a particular asset is selected for use as collateral by the collateralisation search engine 37 on the basis of erroneous asset status data, then it will come to light during settlement (i.e. when the assets are physically transferred to the CR in accordance with the terms of the repo transaction), and may lead to the terms of the repo transaction remaining unfulfilled—for example, where the sum of the values of the provided assets are insufficient to collateralise the loan, or where an asset has been selected for use as collateral whose actual characteristics no longer satisfy the aggregated search criteria. Similarly, if the asset has been used for another action, and the agent's mirrored asset database has not been appropriately updated, there is a risk that this asset could be selected by the collateralisation search engine 37. During settlement it would quickly become clear that the asset is no longer available, and would ultimately result in the CG not fulfilling their part of the agreed repo transaction. The above problems tend to arise where the state of an asset varies over a short period of time, and the mirrored asset database is not updated frequently enough to reflect the asset status in real time.

A further shortcoming of the prior art information systems, and specifically prior art collateralisation systems, is the time and resources required of the collateralisation search engine 37 to carry out the collateralisation search—in other words, the time and resources required to search the mirrored asset database or the agent's asset depository 34, as the case may be depending on the specific implementation in the prior art.

For illustrative purposes only, where each asset comprises at the very least ten different characteristics, and each one of the CG and CR define a threshold value for each one of the ten different asset characteristics that must be satisfied in order for the asset in question to be used as collateral, and the database or the asset depository 34 comprises 1000 different assets, then the collateralisation search engine 37 must search a total of 10,000 different characteristics in order to determine which assets satisfy a single aggregated search query. This search is repeated for each different aggregated search query. These values are for illustrative purposes only, as in practice each asset may comprises significantly more characteristics, and each user may comprise on the order of thousands or hundreds of thousands of different assets. Accordingly, the number of characteristics that are searched for each different aggregated search query is staggeringly large. Furthermore, the collateralisation search engine 37 is configured to carry out aggregated searches for thousands if not hundreds of thousands of different repo transactions per day. This means that the processing overheads required of the collateralisation search engine are extremely high.

One way in which the above problem is mitigated for is by restricting the number of different collateralisation searches afforded to each user per unit of time. For example, each user may be restricted to a single aggregated search per day (i.e. one repo transaction per day). This solution is unduly limiting, since it significantly limits the utility of existing electronic collateralisation systems.

It is an object of the present invention to at the very least address some of the above described shortcomings of existing prior art information systems, and in particular to address the shortcomings of information systems used in the financial industry. However, it is to be appreciated that the solutions provided by the present invention may be implemented in any information system, and are not restricted for use in the financial industry.

Figure 2:
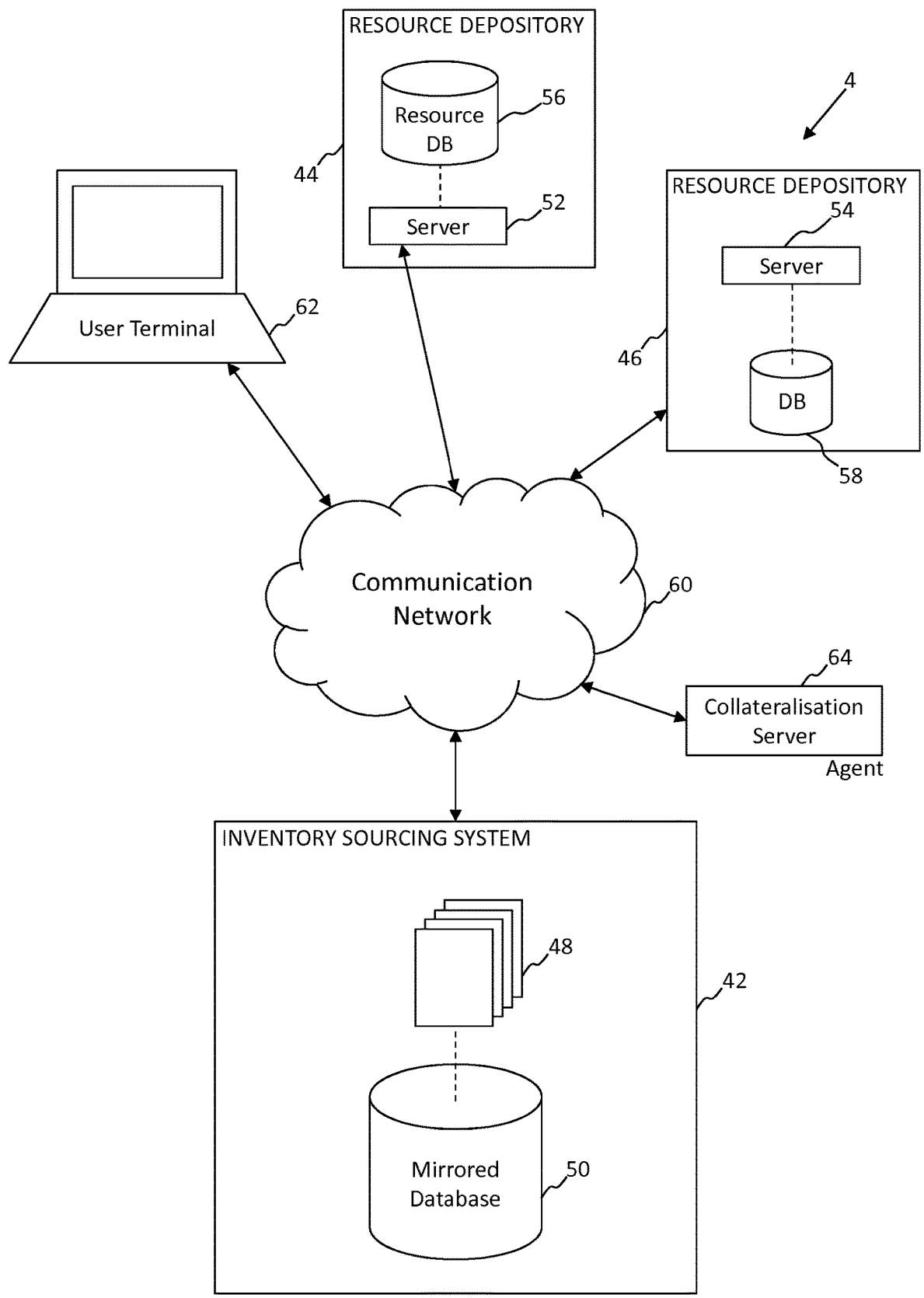
Figure 3A:
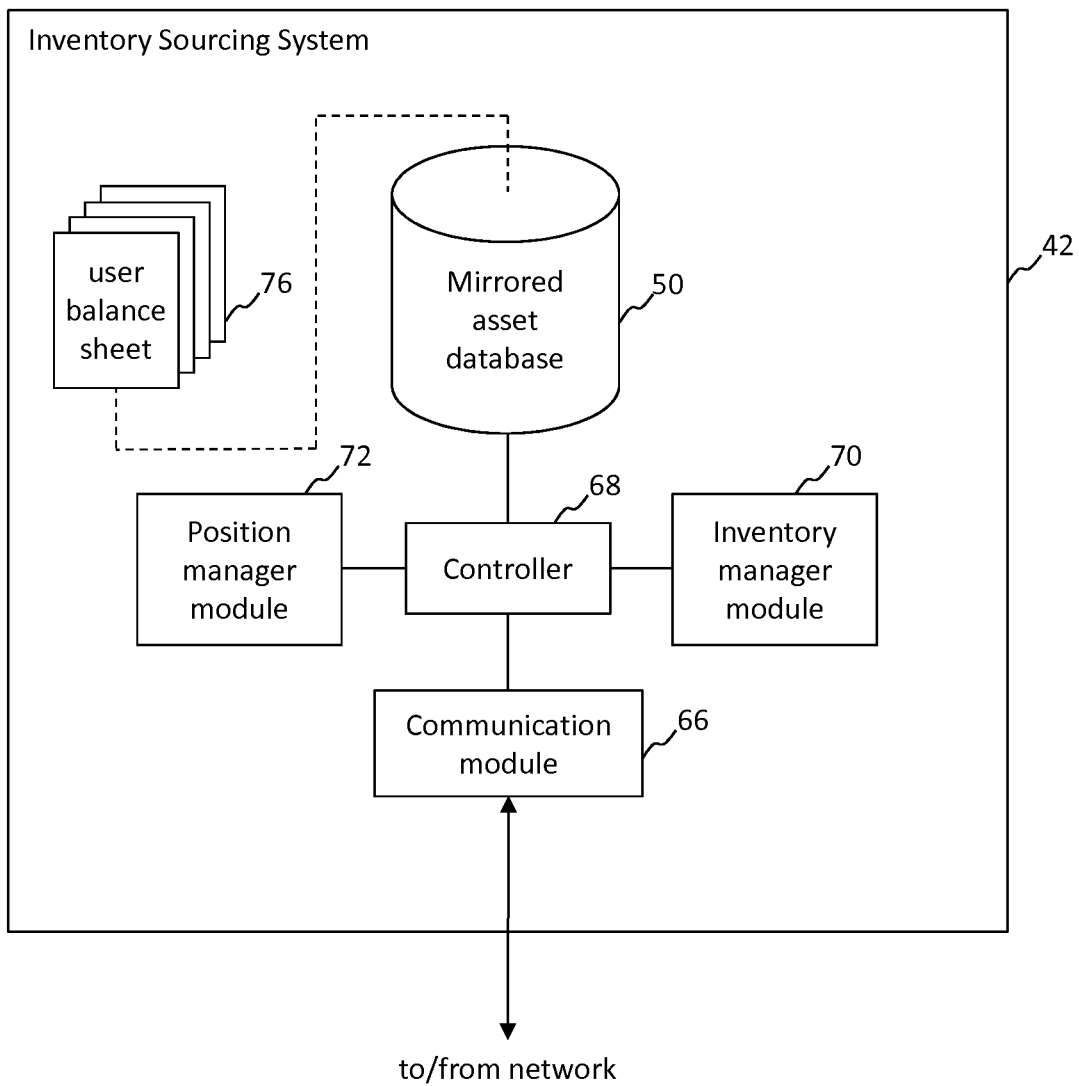
Figure 3B:
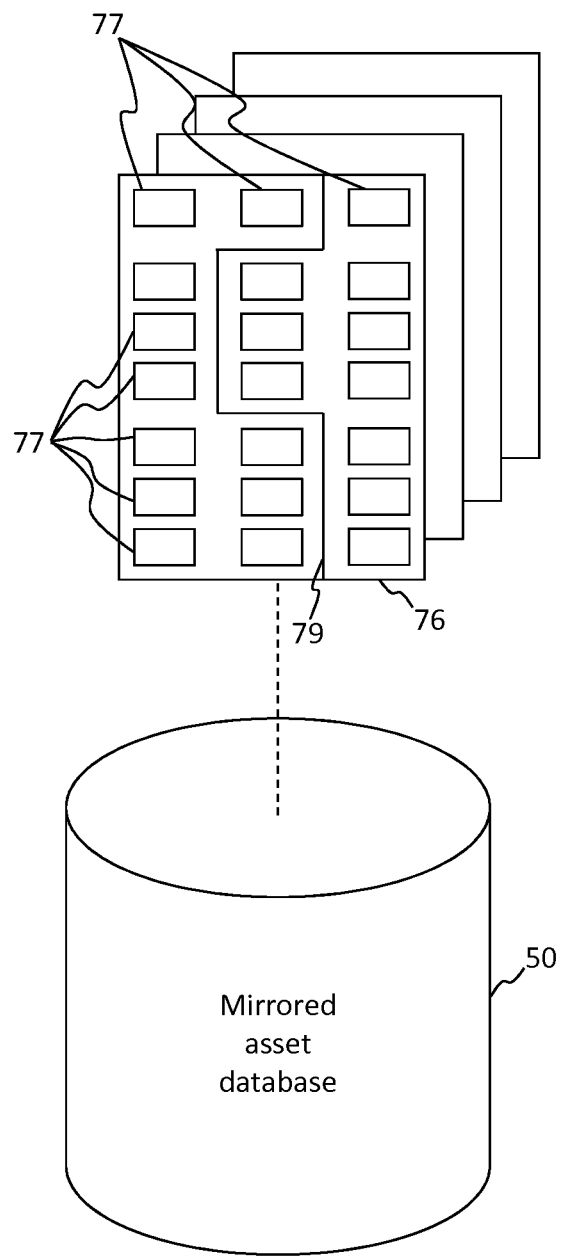
Figure 4:
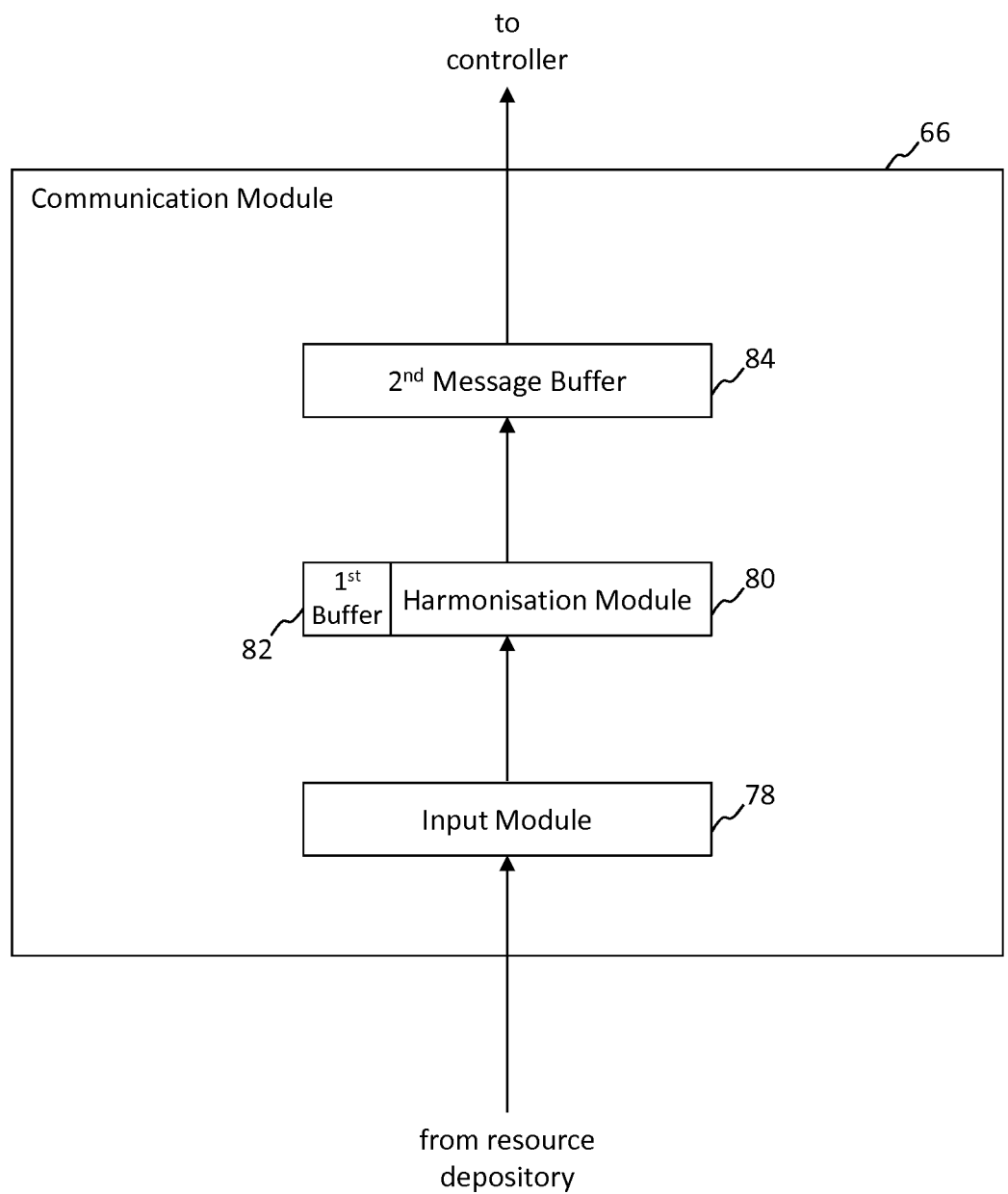
Figure 5:
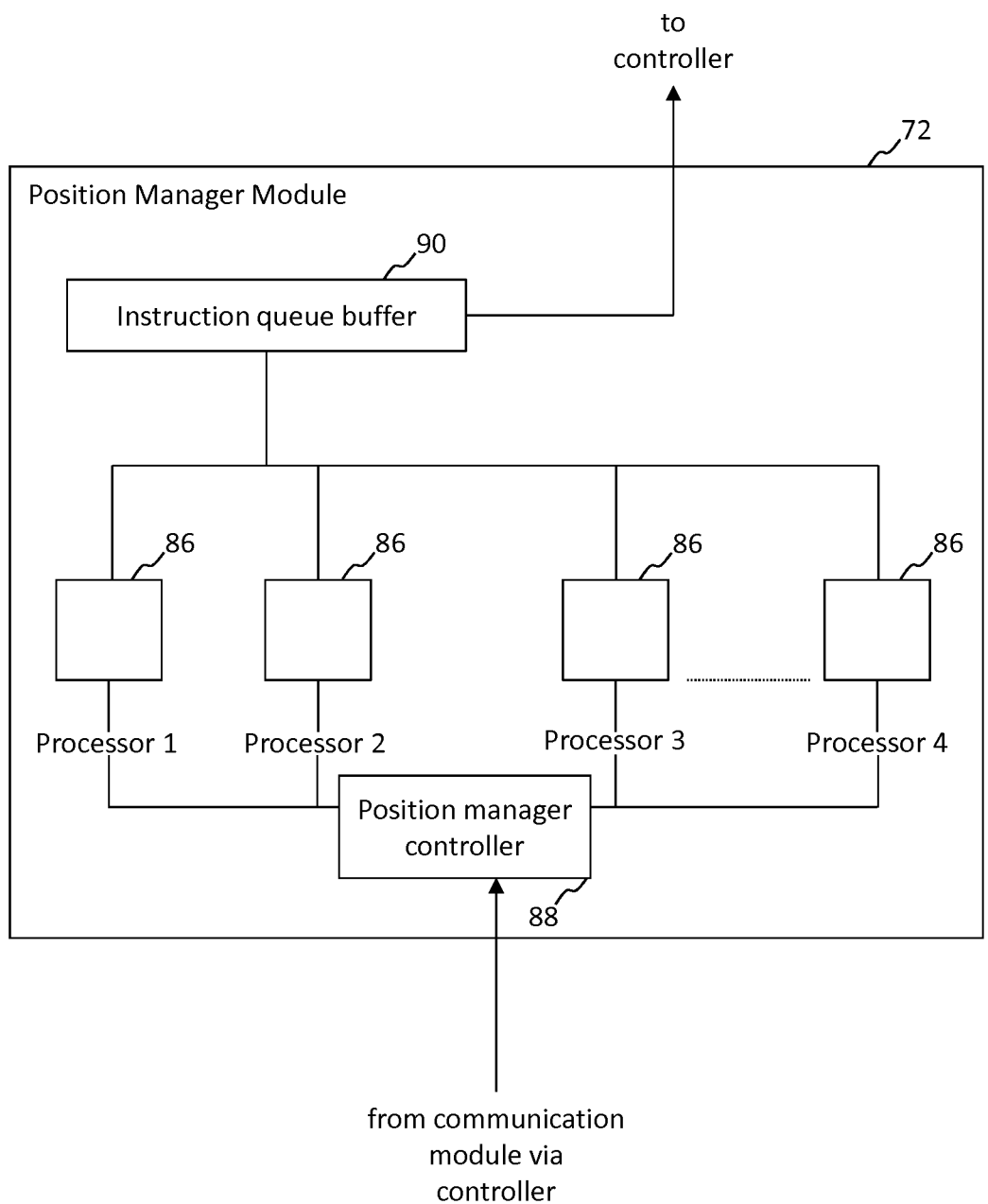
Figure 6:
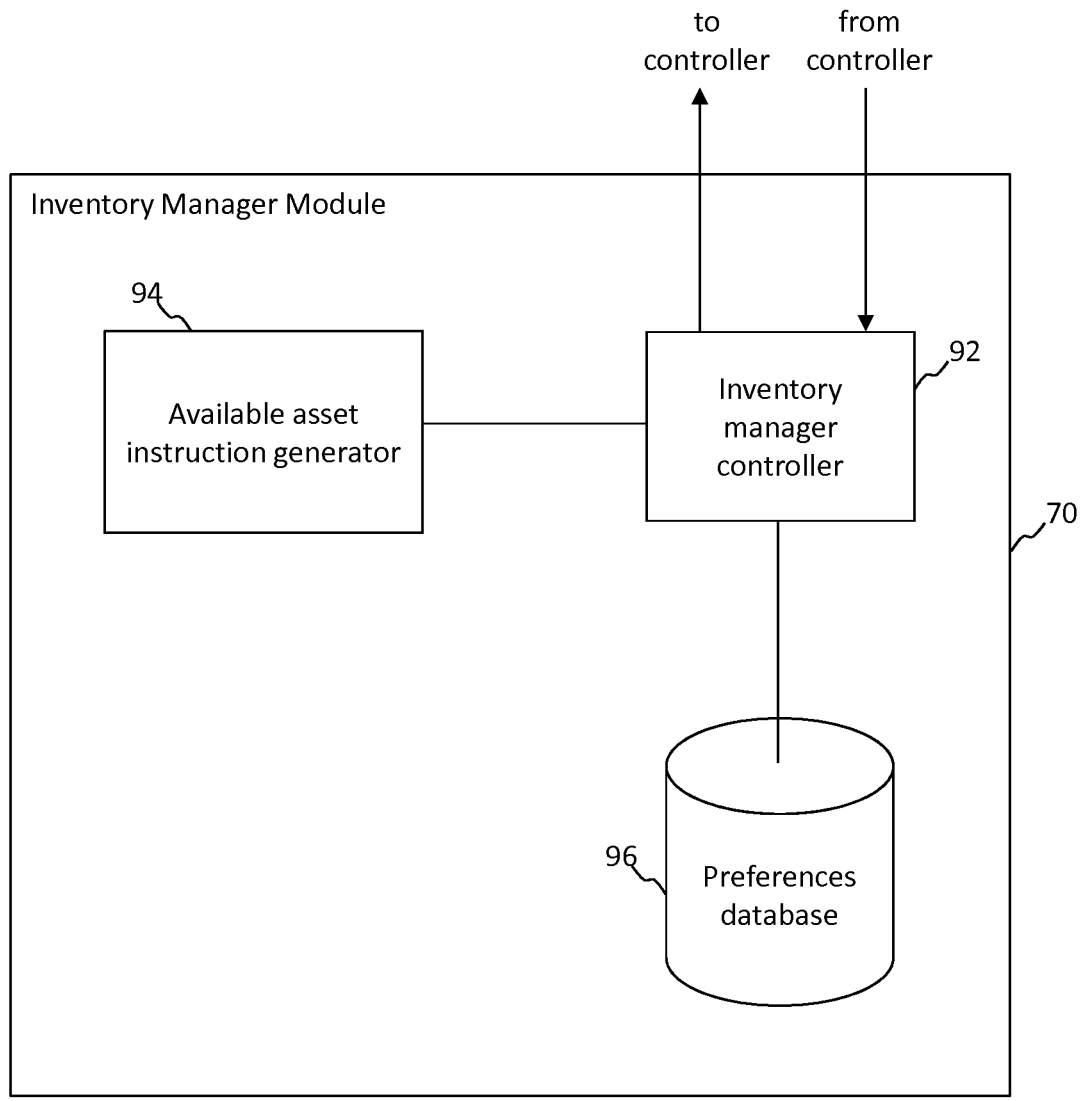
Figure 7:
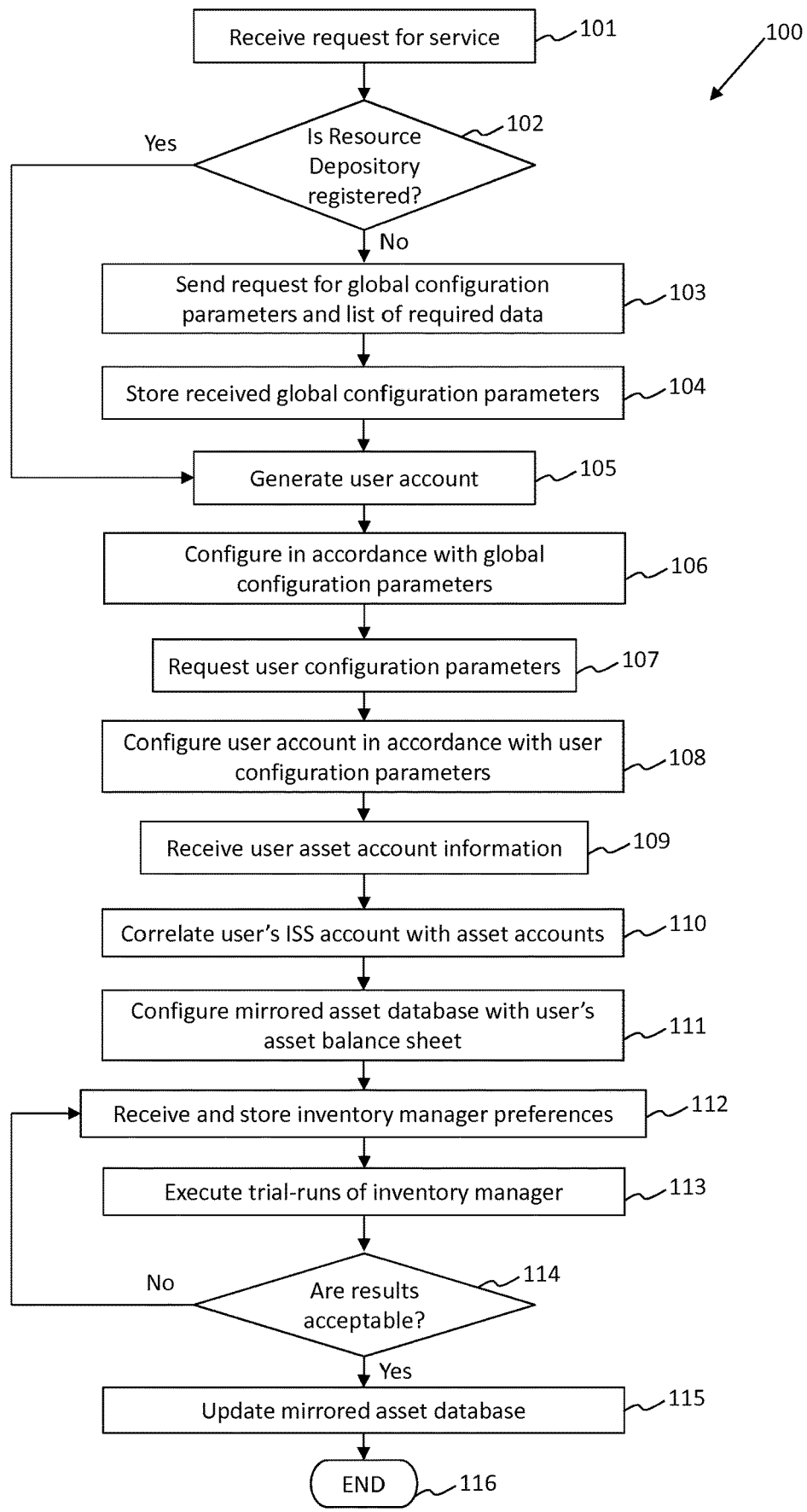
Figure 8:
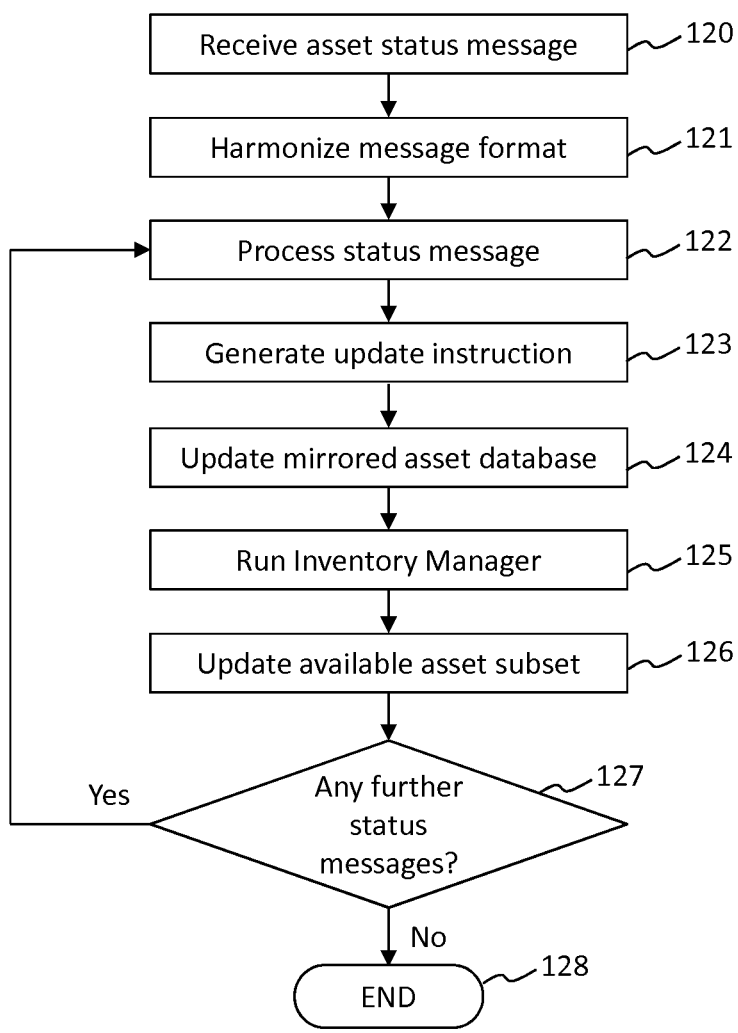

In order that the present invention may be more readily understood, one or more embodiments of the invention will now be described, by way of non-limiting example, with reference to the following figures, in which:

FIG. 2 is a schematic illustration of an information system comprising an Inventory Sourcing System in accordance with an embodiment of the invention;

FIG. 3a is a schematic illustration of the functional components of the Inventory Sourcing System of FIG. 2;

FIG. 3b is a visual illustration of the mirrored asset database and users' electronic balance sheets of FIG. 3a, and shows how the assets comprised in electronic balance sheets can be separated into a subset of available assets;

FIG. 4 is a schematic illustration of the functional components of a communication module of the Inventory Sourcing System illustrated in FIG. 3a;

FIG. 5 is a schematic illustration of the functional components of a position manager module of the Inventory Sourcing System illustrated in FIG. 3a;

FIG. 6 is a schematic illustration of the functional components of the inventory manager module of the Inventory Sourcing System illustrated in FIG. 3a;

FIG. 7 is a process flow chart highlighting an initial registration process implemented by the Inventory Sourcing System of FIGS. 2 and 3a; and FIG. 8 is a process flow chart highlighting a method implemented by the position manager module of FIG. 5 and the inventory manager module of FIG. 6.

DETAILED DESCRIPTION OF EMBODIMENTS

Figure 1:
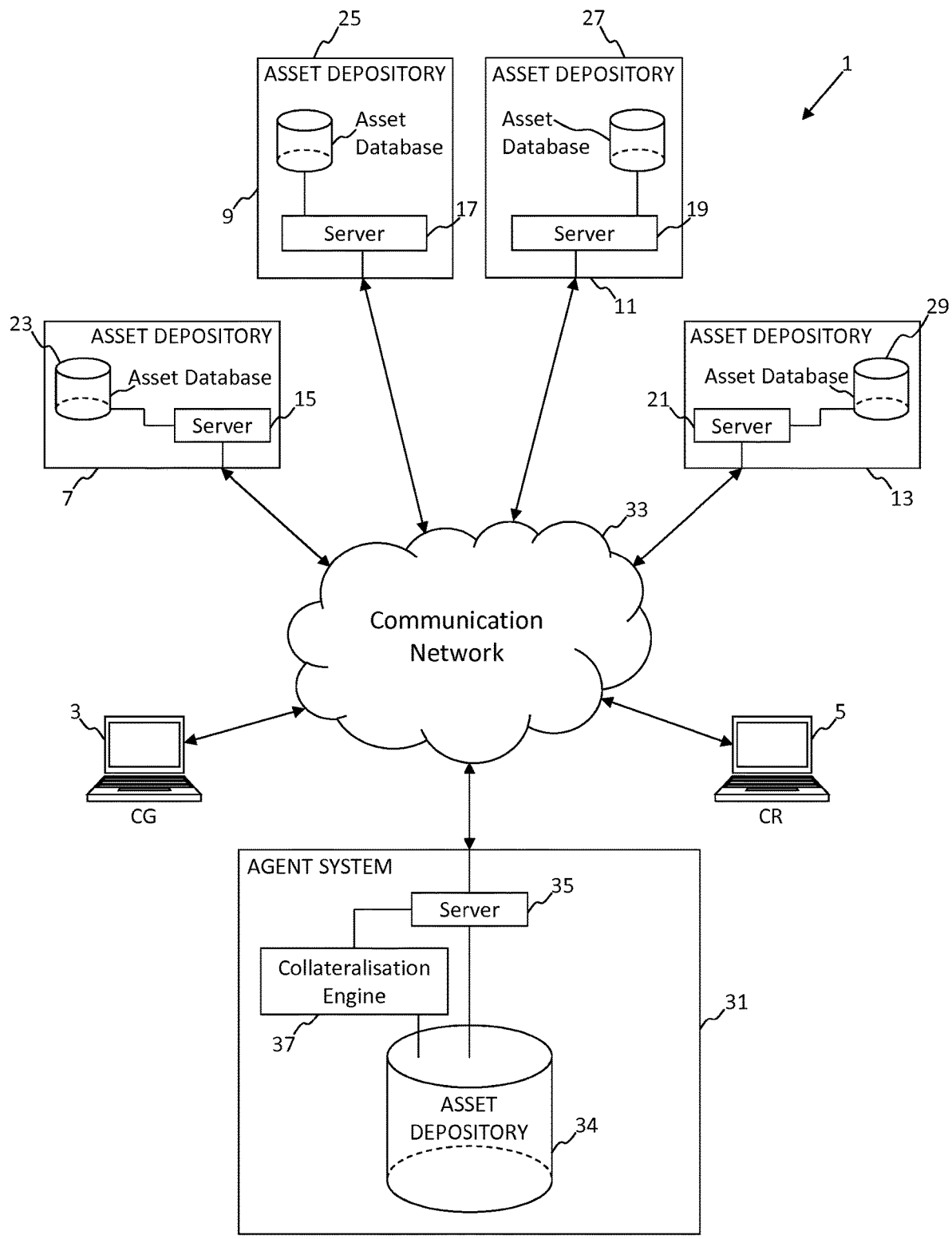
FIG. 1, which is a schematic illustration of a prior art information system, and has already been described above by way of background to the present invention.

FIG. 2 illustrates an example of an information system 40 in which an embodiment of the present invention is implemented. In particular FIG. 2 illustrates an Inventory Sourcing System 42 arranged to inventorise resources comprised within the information system 40, the resources being held at one or more different remotely located resource depositories 44, 46. The Inventory Sourcing System 42 comprises a mirrored resource database 50. Each one of the resource depositories 44, 46 are substantially similar to the resource depositories 9, 11, 13 described previously in the background section in relation to FIG. 1, and each comprises a server 52, 54. A resource database 56, 58 is operatively coupled to each server 52, 54. Each database 56, 58 comprises a list of resources held by the specific resource depository.

In those embodiments where, for example, the resources relate to financial assets, the resource depositories may relate to different financial asset holding entities such as banks, and/or securities holding companies. In such embodiments, the resource depository resource databases 56, 58 may be further subdivided into different user accounts. In turn each user account comprises a database of the specific user's assets. In such embodiments, the Inventory Sourcing System's mirrored resource database 50 comprises a record 48 of each user's assets. In other words, the mirrored asset database 50 is further divided into different user accounts, with each user account comprising a database of all the specific user's assets.

In use, the Inventory Sourcing System 42 is arranged to inventorise (namely, to create an inventory) the resources held in each one of the resource depositories 44, 46. In this way, the mirrored resource database 50 is able to maintain a record of all the resources distributed throughout the information system 40, available to each user. For example, a user may own different resources held by different resource depositories 44, 46—the different resource depositories 44, 46 may in this instance relate to different banks in different countries for example.

The Inventory Sourcing System 42 is also arranged to maintain the mirrored asset database 50 and keep it up-to-date, by ensuring the asset status information is current. It is to be appreciated that whilst FIG. 2 shows only two resource depositories 44, 46 this is a non-limiting example that is being provided for illustrative purposes only. The Inventory Sourcing System 42 is typically configured to inventorise the resources held in a plurality of different resource depositories (though it can even work with just a single resource depository).

The Inventory Sourcing System 42 and the resource depositories 44, 46 are operatively connected to a shared communications network 60, which may relate to the internet, or any other wide access network (WAN) for that matter, or a local access network (LAN) if the different resource depositories 44, 46 are in relatively close proximity. In this way, data messages may be forwarded between the different resource depositories 44, 46 and the Inventory Sourcing System 42.

To initiate the inventorising process, a user at a first user terminal 62 provides contact information to the Inventory Sourcing System 42 regarding the contact details of the one or more different resource depositories 44, 46 holding the user's resources. In certain embodiments, a user registration process may be required, whereby the user creates a customised user account with the Inventory Sourcing System 42. Contact information associated with the locations of the one or more different depositories 44, 46 holding the user's resources, such as IP addresses, and where necessary login details and user account details, may be provided during the registration process. In this way, information regarding the resources held in the one or more different resource depositories 44, 46 may be obtained by the Inventory Sourcing System 42 directly from the one or more different resource depositories 44, 46.

Alternatively, or in addition to the above, each resource depository 44, 46 may be instructed to push information (also referred to as resource data) describing a user's resources directly to the Inventory Sourcing System 42, such that this resource data held in the one or more resource depositories 44, 46, and specifically resource data held in the resource databases 56, 58, is forwarded to the Inventory Sourcing System 42, where it is processed and stored in the mirrored resource database 50. For example, once the user has enrolled with the Inventory Sourcing System 42, the user may be provided with a unique identifier, such as a unique identification number or similar, which uniquely identifies the user's account within the mirrored resource database 50. This helps to distinguish between different user accounts, and by extension to distinguish between the resources available to different users of the Inventory Sourcing System 42, within the mirrored resource database 50. The unique identifier is provided to each one of the one or more asset depositories 44, such that an association may be established between a user's one or more resource depository accounts and the user's Inventory Sourcing System account. Resource information, along with the user's unique identifier are pushed to the Inventory Sourcing System 42 in a data message. The unique identifier enables the Inventory Sourcing System 42 to identify the relevant inventory sourcing system user account that the received data message is relevant to. Once the relevant Inventory Sourcing System user account has been identified, the contents of the received data message are processed and used to maintain the mirrored resource database 50 and ensure the mirrored resource database 50 is comprised of the correct resource information. This arrangement is particularly useful for communicating resource status updates to the Inventory Sourcing System 42 from the one or more different resource depositories 44, 46.

Alternatively, or in addition to the above, the Inventory Sourcing System 42 may be configured to pull resource information directly from each one of the one or more different resource depositories 44, 46. In such embodiments, an identifier which uniquely identifies a user's resource depository account is provided to the Inventory Sourcing System 42. This is repeated for each user resource depository account. To subsequently pull information from the relevant resource depository, the Inventory Sourcing System 42 generates an information request message for each one of the one or more different resource depositories 44, 46 that comprise resources owned by the relevant user. The information request message comprises the unique identifier associated with the specific user's resource depository account, and optionally a list of the required resource data. Upon receipt of the information request message, the resource depository identifies the relevant user's resource account on the basis of the provided unique identifier. Use of unique identifiers facilitates the identification of the relevant resources owned by the relevant user and held by the resource depositories 44, 46. Information associated with the relevant user's resource account, and specifically information associated with the user's resources are subsequently pulled to the Inventory Sourcing System 42, where the information is processed and stored in the relevant user account within the mirrored resource database 50.

As described above, using either pull or push technology a mirrored resource database 50 comprising an image of all of the resources associated with each of a plurality of user and held by one or more remotely located resource depositories 44, 46 may be generated and maintained. In preferred embodiments the push or pull resource status messages are forwarded to the Inventory Sourcing System 42 on a periodic basis.

The resource records held for a user in the mirrored resource database 50 are further filtered into at least one qualifying subset of resources, on the basis of user-defined resource parameters. The user-defined resource parameters relate to resource characteristics and are defined by the user at the user terminal 62.

For example, in embodiments where the resources relate to financial assets, the user-defined-parameters specify one or more asset characteristics that an asset must satisfy in order to qualify for inclusion in the at least one qualifying subset. The qualifying assets may subsequently be used in further actions, such as electronic collateralisation transactions. Such embodiments are explained in further detail in the ensuing description.

For illustrative, non-limiting purposes only, embodiments of the present invention will now be described within the context of financial information systems, where the resources relate to financial assets. However, it is to be appreciated that this is for illustrative purposes only, and the Inventory Sourcing System 42 of the present embodiment is not limited to use with such systems. Instead, the Inventory Sourcing System 42 could be used in combination with any type of information system, and any type of system resource.

Within the context of financial information systems, the mirrored resource database 50 will now be referred to as a 'mirrored asset database' in the ensuing description. The mirrored asset database is structurally identical to the mirrored resource database 50 of FIG. 2, and for this reason the mirrored resource database 50 of FIG. 2 will interchangeably be referred to as a 'mirrored asset database' in the ensuing description.

The subdivision of the asset records held for a user in the mirrored asset database 50 is analogous to a filtering action, in which assets that satisfy one or more user-defined asset characteristics (also referred to herein as "qualifying assets") are separated into at least one subset of the total user's assets. For example, the qualifying assets may relate to a subset of assets that the user is willing to make available for use in a subsequent electronic collateralisation transaction, in which case the user-defined asset characteristics define the minimum characteristics qualifying assets must satisfy in order to be made available for use as collateral in a subsequent repo transaction. The qualifying assets define the qualifying subset of the user's total available assets that the user is prepared to make available for use in a subsequent repo transaction.

The user-defined asset characteristics are forwarded to the Inventory Sourcing System 42, where they are processed. The received asset characteristics are used to define and generate the qualifying subset of assets. For example, in such repo transactions, a tri-party collateralisation search engine 64 queries the qualifying subset of assets in order to identify and select assets for use as collateral. This type of targeted search on a pre-filtered subset of available assets is a more efficient way of searching for assets for use as collateral in a repo transaction. Assets are identified more quickly since the search is carried out on a subset of a user's total available assets. A further advantage of restricting the collateralisation search engine's 64 search to the qualifying subset of assets, is that this significantly simplifies the search process, and in particular the processing overhead required by the search query to identify and select qualifying assets for use as collateral. This is illustrated in greater detail in the below example.

In preferred embodiments, when the Inventory Sourcing System 42 is used in combination with an electronic collateralisation system, the collateralisation search engine 64 restricts its search for assets satisfying the terms of the repo transaction to the qualifying subset of assets. In this example, the Inventory Sourcing System user is the collateral giver (CG). Since the qualifying subset is effectively a pre-filtered set of assets that the CG has already confirmed are available for use in subsequent repo-transactions, the collateralisation search engine 64 is only required to search the qualifying subset of the mirrored asset database 50, and to identify those assets that satisfy the collateral receiver's (CR) collateralisation requirements. Accordingly, the number of asset records to be searched by the collateralisation search engine 64 is significantly reduced, and it is not necessary to generate an aggregated search query—the collateralisation search engine 64 can simply search the subset of qualifying assets comprised in the CG's account in the mirrored asset database 50 to identify those assets which satisfy the CR's requirements. Collateralisation search results are accordingly returned significantly faster, and requiring less processing overhead than the existing prior art solutions.

For example, considering the previous example set out in the background section, and assuming that the CG has defined the asset characteristics to be satisfied by assets qualifying for inclusion in the qualifying subset of available assets as having the following characteristics:

Asset Type: Stock
Minimum Credit Rating (S&P/Fitch Rating): CCC
Maximum Credit Rating (S&P/Fitch Rating): AA The qualifying subset exclusively comprises assets having the above characteristics. In a subsequent tri-party repo transaction, the CR defines their collateralisation requirements, by defining the following asset characteristics that must be satisfied by the CG's assets for use as collateral:

Asset Type: Bonds, Stock
Minimum Credit Rating (S&P/Fitch Rating): A+
Maximum Credit Rating (S&P/Fitch Rating): No maximum In order to identify assets for use as collateral, the collateralisation search engine 64 generates a search query generated from the CR's provided collateralisation requirements. The collateralisation search engine 64 then applies the search query to the qualifying subset of assets of the mirrored asset database 50 to identify those assets that satisfy the CR's collateralisation requirements.

In certain embodiments, the generated search query may be further simplified. This is achieved by the collateralisation search engine 64 carrying out a pre-search comparison of the user-defined asset characteristics defining the characteristics of assets held in the qualifying subset, with the CR's collateralisation requirements, in order to generate a simpler search query. In this instance, the search query may be simplified by querying the qualifying subset for assets having an A+ credit rating. This is achieved by logically analysing the asset characteristics defining the subset of qualifying assets, with the CR's collateralisation requirements, and removing any redundancy to generate a simplified search query. In this particular instance, 'asset type' is a redundant search criteria. Whilst the CR is willing to accept bonds and/or stocks as collateral, the subset of qualifying assets have been restricted to stocks only. It is therefore redundant to incorporate this criteria in the search query generated by the collateralisation search engine 64, and to compare this requirement with the characteristics of every asset in the qualifying subset, because any search of the subset of qualifying assets will always return a stock as a search result. The only search criteria that needs to be incorporated into the collateralisation search engine's search query is the minimum credit rating. As the subset of qualifying assets comprises assets having credit ratings ranging from CCC to AA, unless the search query is restricted to assets having a minimum of A+ as required by the CR's collateralisation requirements, then results may be returned which do not satisfy the CR's collateralisation requirements.

In a further embodiment, and where required, the CG may specify additional parameters affecting the repo transaction, which are not directly considered when generating and maintaining the qualifying asset subset. For example, the CG may wish to define a diversification parameter, which defines the minimum required diversity of the assets selected by the collateralisation search engine 64 for use in a repo transaction. In other words, the diversification parameter defines the minimum variety required in the assets selected for collateral. For example, the CG may decide that a minimum of three different assets must be selected for use in collateral. The collateralisation search engine 64 will then ensure that at the very least three different assets are selected for use as collateral in a repo transaction. Similarly, the CG may also define the minimum and/or maximum value of any one asset that may be selected for use as collateral. For example, the CG may limit the maximum value of any one asset for use as collateral to $500,000, in which case the collateralisation search engine will ensure that the value of any one asset does not exceed the maximum allowed value. Collateralisation parameters defined by the CG, which relate exclusively to a specific repo transaction and are not otherwise used to configure the qualifying subset of assets, details of which are held in the mirrored asset database 50, will be referred to as CG collateralisation parameters to distinguish them from the qualifying parameters used to define the characteristics of qualifying assets of the qualifying subset of assets. The CG collateralisation parameters may be provided to the collateralisation search engine 64 directly by the CG, or alternatively may be held in the mirrored asset database 50, and are obtained by the collateralisation search engine 64, when querying the subset of qualifying assets. In such embodiments, the CG collateralisation parameters are included in the collateralisation search query generated by the collateralisation search engine 64.

Returning to the Inventory Sourcing System 42, to ensure that the mirrored asset database comprises an accurate, up-to-date image of a user's assets, asset status updates are forwarded to the Inventory Sourcing System 42 from the relevant resource depositories 44, 46 periodically. In certain embodiments, the status updates are forwarded from the relevant resource depositories 44, 46 whenever an asset's status changes. This enables the mirrored asset database 50 to be updated in real-time, and ensures that the mirrored asset database 50 comprises an accurate and up-to-date image of the status of all a user's assets.

The qualifying subset of assets is also updated periodically to ensure the accuracy of the subset. In certain embodiments, this comprises periodically querying the mirrored asset database 50 to identify assets that satisfy the asset characteristics defining the qualifying subset. In alternative embodiments, a more targeted approach is applied, wherein the query is executed only on those assets whose status has changed in a predefined period of time. For example, as an asset status update is received and the corresponding mirrored asset database entry is updated accordingly, a further query of the updated asset state is carried out to determine if the updated asset still meets the asset characteristics for inclusion in the qualifying subset. In this way, the query is only executed in respect of resources whose statuses have changed. This results in a more efficient use of processing resources, and reduces the amount of time required to maintain the qualifying subset of assets up-to-date. If an asset status has changed and no longer satisfies the asset characteristics for inclusion the qualifying subset, then it is removed from the subset once the received asset status update message has been processed. In this way, the content of the qualifying subset is dynamically varied on the basis of received asset status updates—the content of the qualifying subset of assets thus may vary over time as asset statuses change.

Specific details of the Inventory Sourcing System 42 will now be described with reference to FIGS. 3 to 7.

FIG. 3a is a more detailed schematic of the modular components comprised within the Inventory Sourcing System 42. The Inventory Sourcing System 42 comprises a communication module 66, a controller 68, an inventory manager module 70, and a position manager module 72. It is to be appreciated that the function of any one of the aforementioned modules 66, 68, 70, 72 may be carried out by independent dedicated hardware, or may be comprised within a single piece of hardware. The system can also be implemented in software instructions operating on general purpose processing hardware, including a processor. For the purposes of the present invention it is not relevant whether the functional modules are executed on dedicated independent hardware, if they are executed on the same hardware or in software on general purpose processing hardware.

The communication module 66 is arranged as the communication interface between the Inventory Sourcing System 42 and the shared communications network 60. The communication module 66 is configured to standardise the format of data messages, specifically asset status data messages received from the different resource depositories 44, 46. Asset status data messages are received and processed by the communication module 66, and where required their format is amended in order to optimise processing by the position manager module 72.

The controller 68 is implemented on a processor and is arranged to control operation of the position manager module 72 and the inventory manager module 70.

The position manager module 72 is configured to maintain the contents of the mirrored asset database 50. As asset status data messages are received by the communication module 66, their format is standardised in accordance with the requirements of the position manager module 72. The formatted status messages are forwarded to the controller 68, where they are subsequently passed to the position manager module 72. The position manager module 72 processes the formatted asset status data messages and updates the mirrored asset database 50 with the up-to-date asset status information recovered from the formatted asset status data messages.

In certain embodiments, the mirrored asset database may comprise an electronic balance sheet 76 or an electronic statement of financial position for each registered user. The electronic balance sheet 76 or the electronic statement of financial position, as the case may be, sets out a user's assets, liabilities and ownership equity. As the value associated with a particular asset varies, the relevant resource depository 44, 46 sends an updated asset status message to the Inventory Sourcing System 42, where, following any necessary message reformatting by the communication module 66, it is forwarded to the position manager module 72 for processing. The position manager module 72 then generates any necessary database updated instructions and updates the electronic balance sheet 76 or electronic statement of financial positions, maintained in the mirrored asset database for the associated user. Going forward, it is to be appreciated that the term electronic balance sheet 76 may also refer to an electronic statement of financial position. It is also to be appreciated that in certain embodiments the electronic balance sheet 76 may only comprise information associated with a user's assets.

In certain embodiments, the asset status data message may be associated with settlement instructions. For example, as the relevant resource depository 44, 46 issues settlement instructions to the relevant securities settlement entity, a copy of the settlement instructions is also forwarded to the Inventory Sourcing System 42. Upon receipt of the copy of the settlement instructions, the position manager module 72 updates the associated user's electronic balance sheet 76 held within the mirrored asset database 50 to account for the securities transaction. In this way, the user's electronic balance sheet 76 is kept up-to-date with the latest asset positions in real-time.

The inventory manager module 70 is arranged to identify the qualifying subset of a user's available assets that satisfy the user-defined asset characteristics, and which subset is queried by the collateralisation search engine 64 in subsequent repo transactions. This is achieved by first identifying all assets that satisfy the user-defined asset characteristics. The qualifying subset of the user's assets is generated comprising the identified assets. Subsequently, the user's electronic balance sheet 76 is reviewed to determine if any of the selected assets are required to securitise the user's existing liabilities. If it is determined that shortlisted assets are required to collateralise the liabilities then these assets are removed from the shortlist. The assets remaining in the shortlist define the qualifying subset of available assets that satisfy the user's predefined asset characteristics, and are available for use in subsequent repo transactions. The user may define the criteria for excluding assets from the subset required to securitise existing liabilities. For example, these criteria may be provided during an initial user enrolment process, whereby the user enrols with the Inventory Sourcing System 42.

The inventory manager module 70 is configured to periodically review and update the qualifying subset of available assets at a required frequency. In certain embodiments, the inventory manager module 70 is configured to query the mirrored asset database 50 daily in order to identify available assets that satisfy the user-defined asset characteristics. For example, the inventory manager module 70 may be configured to query the mirrored asset database 50 once a day, after the securities markets have closed at day's end. Alternatively, the inventory manager module 70 may be configured to query the mirrored asset database 50 multiple times a day, for example on an hourly basis.

FIG. 3b is a schematic illustration of the mirrored asset database 50 comprising a plurality of different users' electronic balance sheets 76. Each electronic balance sheet 76 comprises a record of the specific user's assets 77. Assets comprised on the right hand side of the demarcation line 79 define the subset of qualifying assets. Assets on the left hand side do not satisfy the user defined qualifying asset characteristics. As the status of assets changes in time, the demarcation boundary 79 will shift as new and/or existing assets qualify for inclusion in the subset, and/or previously qualifying assets no longer satisfy the user defined asset characteristics. In this regard, the role of the inventory manager module 70 is to dynamically vary the demarcation boundary to ensure that the assets comprised in the subset of qualifying assets satisfy the user defined qualifying asset characteristics, in response to assets status changes.

Returning to the discussion of FIG. 3a, in yet a further embodiment, the inventory manager module 70 may be configured to carry out targeted updating of the qualifying asset subset. In such embodiments, and as mentioned previously, the inventory manager module 70 carries out a query only on assets whose status has changed within a predefined period of time. For example, the inventory manager module 70 may be configured to only consider assets whose status has changed within the last 24 hours, or in the last hour. The affected assets are identifiable on the basis of the received asset status update data messages processed by the position manager module 72. The affected assets may be identified by simply reviewing the received asset status update data messages. Once the affected assets have been identified, the inventory manager module 70 restricts its query to the affected assets. This significantly facilitates the query process—rather than executing the query on all of a user's available assets, only those assets whose status has changed within the last 24 hours, for example, are queried. In this way, assets which were previously comprised within the shortlist of qualifying assets are removed if their updated status no longer meets the predefined parameter requirements. Similarly, assets which were previously omitted from the shortlist of qualifying assets due to non-compliance with the predefined asset parameters, may subsequently qualify when their updated status satisfies the predefined parameter requirements. Clearly, any assets whose state has not changed will remain in or out of the qualifying subset as determined previously. Accordingly, checks on these static assets can be omitted.

In yet a further embodiment, the inventory manager module 70 may be configured to carry out the query whenever an asset status message is received by the Inventory Sourcing System 42. In such embodiments, the inventory manager module 70 executes the query once the position manager module 72 has updated the relevant user's electronic balance sheet 76 with the updated asset information. In this way, advantageously the subset of available assets that satisfy the predefined asset parameters is updated in real-time, albeit at a slightly higher processing overhead.

FIG. 4 is a schematic diagram of the modular components comprised within the communication module 66 of FIG. 3. The communication module 66 comprises an input module 78 arranged to receive data communications from the one or more resource depositories 44, 46. In certain embodiments, the data communications relate to electronic balance sheet data and asset status update data messages. Data messages received at the input module 78 are date and time stamped to enable the sequence of receipt to be retrospectively determined, and are subsequently forwarded to the harmonization module 80. The harmonization module 80 is arranged to standardise the format of received data messages. For example, the harmonization module 80 is arranged to determine the format of the received data message and to reformat the message to ensure compliance with SWIFT™ and the ISO15022 data format standards. Messages received by the communication module 66 are processed on a first come first serve basis. In other words, the received data messages are processed in the sequential order of receipt.

The harmonization module 82 may comprise a storage buffer 82 arranged to temporarily store received data messages for processing by the harmonization module 80. Received messages are stored in the buffer 82 when the harmonization module 80 is occupied reformatting a previously received message.

Once messages have been processed by the harmonization module 80, and are in the required format for subsequent processing by the position manager module 72 and the inventory manager module 70, they are forwarded to the second message buffer 84, for subsequent transfer to the controller 68. It is to be appreciated that the functional components comprised in the communication module 66 are provided for illustrative purposes and are non-limiting, and any one of the functional modules may be implemented in independent hardware, or the functional modules may be implemented in the same hardware apparatus.

In certain embodiments, the communication module 66 is implemented in dedicated hardware independent from the other Inventory Sourcing System modules. In this way, should the other Inventory Souring System modules suffer a power shutdown, or other operational failure, the communication module 66 is still operational to receive data messages and to process them. In such an embodiment, the second message buffer 84 is arranged to store reformatted received data messages in the sequential order in which they were originally received by the input module 78 and processed by the harmonization module 80. Buffered reformatted data messages are subsequently forwarded from the second message buffer 84 to the controller module 68 when it is operational again.

FIG. 5 is a more detailed schematic illustration of the position manager module 72 in accordance with an embodiment of the invention. The position manager module 72 comprises a flexible processor architecture. For example, a plurality of processors 86 arranged in parallel, and whose operation is controlled by a position manager controller 88. Asset status messages are received from the communication module 66 via the controller 68, at the position manager controller 88. The position manager controller 88 is arranged to control and allocate the required processing resources for processing the reformatted asset status data messages. In particular, the position manager controller 88 determines which one of the plurality of processors 86 is available to process a received reformatted status message, and forwards the reformatted status message to the next determined available processor 86. Each one of the plurality of processors 86 is arranged to process a received reformatted asset status data message and to generate a database update instruction for execution on the mirrored asset database 74, in order to update the affected user's electronic balance sheet 76 with the latest asset status information. The parallel processor architecture provides the position manager module 72 with the ability to vary its processing power depending on the volume and processing demands of the reformatted status messages. The position manager controller is arranged to determine the number of processors 86 required to process the received reformatted status messages. For example, this may be determined by calculating whether the rate at which status messages are received is greater than the rate at which the plurality of processors are able to process the messages, as determined from the processor outputs. If the rate at which the status messages are received is greater than the rate at which the processors are outputting mirrored asset database 50, or electronic balance sheet 76 update instructions, then this is indicative that a bottleneck is forming at the processors 86 and further processing resources are required. The position manager module 88 is arranged to determine whether a bottleneck is forming, and dependent on the results of this determination, further processors are made available, until the rate at which messages are received is equal to or less than the rate at which the plurality of processors 86 are generating and outputting instructions for execution by the mirrored asset database 74. The position manager controller 88 is also configured to forward received asset status data messages to the plurality of processors 86 in the sequential order in which they are received, on the basis of the associated date and time stamp. In other words, status messages that were received first, as determined from their associated time and date stamp by the position manager controller 88, are forwarded to available processors for processing before later received status messages. By varying (switching on or off) the number of processors 86 in operation on the basis of the volume of received asset status messages, the position manager controller 88 is able to ensure that data traffic bottlenecks are not formed and that received status messages are processed in real-time.

The generated database update instructions also comprise the date and time stamp information of the associated asset status data message. The generated database update instructions along with the date and time stamp information are forwarded from the processors 86 to the instruction queue buffer 90, where the instructions are queued in sequential order on the basis of their associated date and time stamps. The database update instructions are subsequently forwarded from the instruction queue buffer 90 to the mirrored asset database 50, via the controller 68. Upon receipt at the mirrored asset database 74, the instructions are processed and the associated electronic user balance sheet 76 is updated to reflect the up-to-datemost current asset positions. In alternative embodiments, the database update instructions may be forwarded directly to the mirrored asset database 50, without first routing the instructions via the controller 68.

FIG. 6 is a schematic illustration of the functional components of the inventory manager module 70 in accordance with an embodiment of the invention. The inventory manager module 70 comprises an inventory manager controller 92, an available asset instruction generator 94, and a preference database 96. The inventory manager controller 92 is arranged to communicate with the Inventory Sourcing System controller 68. The available asset instruction generator 94 determines which assets are available for use in a subsequent action, such as a repo transaction, and generates instructions for execution by the mirrored asset database 50, in order to define the qualifying subset of available assets for each user. The preference database 96 comprises the user-defined asset characteristics, which define which assets qualify for inclusion in the qualifying subset of available assets. In addition, the preference database 96 is used by the available asset instruction generator 94 to determine which assets comprised in the relevant user's electronic balance sheet 76 qualify for inclusion in the qualifying subset of available assets.

As mentioned previously, the user preferences are defined by the user, during an initial registration process, which is described in further detail below. The preferences database 96 may also define how frequently the available asset instruction generator 94 generates and updates the subset of available assets. This may be defined by the user during the initial enrolment process. For example, and as mentioned previously, in certain embodiments the qualifying subset of available assets may be maintained daily at market close, or alternatively may be maintained whenever asset status messages are received by the communication module 66. The preferences comprised within the preference database may also define other rules for determining available assets, which are discussed in further detail below. Once the available asset instruction generator 94 has identified available assets, an instruction message is generated and forwarded to the mirrored asset database 50 via the inventory sourcing system controller 68. The instruction message is subsequently executed by the mirrored asset database 50, and the relevant user's electronic balance sheet 76 is updated to highlight the current qualifying subset of available assets.

An example of an enrolment process 100 is now described with reference to FIG. 7. FIG. 7 is a process flow chart which outlines the different steps involved in the initial enrolment process 100. The process chart of FIG. 7 will also be described with reference to the schematic system diagram of FIG. 2.

In certain embodiments, before a user of a resource depository 44, 46 may avail themselves of the functionality of the Inventory Sourcing System 42, the relevant resource depository 44, 46 enrols with the Inventory Sourcing System 42. Following this, the specific user enrols with the Inventory Sourcing System 42. Resource depository enrolment is initiated by the relevant resource depository 44, 46 forwarding a request for service to the Inventory Sourcing System 42. The request for service is received at Step 101 by the Inventory Sourcing System 42. The request for service is received by the communication module 66, and specifically by the input module 78. The request for service is forwarded through to the controller 68, bypassing the harmonization module 80 and the message buffer 84, given that the request does not relate to an asset status message, and it also does not reference an existing account comprised within the mirrored asset database 50, or a resource depository account number associated with an existing mirrored asset database user account, such as an existing user's electronic balance sheet 76. In this regard, in certain embodiments, asset status messages comprise a mirrored asset database identifier, such as a user's mirrored asset database account number, which enables the position manager module 72 to identify the relevant user's mirrored asset database account, and more specifically the relevant user's electronic balance sheet 76. Alternatively, the relevant user's electronic balance sheet 76 may be identified on the basis of the user's asset depository account, for example the user's bank account number. In such embodiments, the user's electronic balance sheet 76 is associated with the relevant asset depository account.

The controller 68 processes the received request for service, and queries at Step 102 whether the resource depository 44 sending the request for service has previously registered with the Inventory Sourcing System 42. If the resource depository 44 has previously registered with the Inventory Sourcing System 42, then the method proceeds to user account generation, at Step 105. Otherwise, if it is determined at Step 102 that the resource depository 44 has not yet registered with the Inventory Sourcing System 42, then the Inventory Sourcing System 42 sends at Step 103 a request for global configuration parameters along with a request for a list of required data, to the relevant resource depository 44, 46. The global configuration parameters relate to parameters which customise the interaction between the Inventory Sourcing System 42 and the relevant resource depository 44, 46. The global customization parameters affect all users having accounts with the subject resource depository 44, 46. For example, if the resource depository 44 has specific message-formatting requirements that must be adhered to to enable effective communication with the Inventory Sourcing System 42, then the details of such data-formatting requirements may be defined in the global customization parameters.

The request for the list of required data, which is also transmitted at Step 103 to the resource depository 44, defines the minimum data that is required by the Inventory Sourcing System 42. For example, user account number may, in certain embodiments, relate to an essential data requirement, without which the Inventory Sourcing System 42 is unable to offer the required services. In addition, the type of asset information required by the Inventory Sourcing System 42 is also set out in the list of required data. The list of required data defines the minimum data required by the Inventory Sourcing System 42 to provide the required functionality. This includes setting out the minimum required asset and/or resource depository account information required to enable the position manager module 72 to establish a mirror image of the specific user's assets (e.g. the user's electronic balance sheet 76), and the minimum amount of asset information required by the inventory manager module 70 to determine which assets qualify for inclusion in the subset of available assets. The specific details of the minimum required data will vary between different embodiments.

In certain embodiments, the resource depository enrolment process may comprise selecting the relevant global customization parameters from within an electronic form. The electronic form may be completed by a representative of the relevant resource depository 44 on a computer terminal. This comprises for example, selecting the global customisation parameters that are applicable and/or desired by the relevant resource depository in its future interactions with the Inventory Sourcing System 42.

In certain embodiments, the customization parameters may also define the scope and content of data messages that will be forwarded from the resource depository 44 to the Inventory Sourcing System 42. For example, this may relate to the type of SWIFT messages adopted by the specific resource depository 44 that will be forwarded to the Inventory Sourcing System 42. Similarly, if the resource depository 44, implements specific types of custom processes within the asset settlement lifecycle, then the details of these processes may be communicated to the Inventory Sourcing System 42. Information about custom asset lifecycle processes may be beneficial under certain circumstances. For example, this information can also be used to enable the Inventory Sourcing System 42 to determine the status of an asset. This is information is particularly advantageous when asset status update messages are not received in chronological order. In particular, information about the asset settlement lifecycle can be used by the Inventory Sourcing System 42 to determine which part of the settlement lifecycle process the update messages relate to, and thus infer the correct chronological order in which the received messages need to be processed.

In certain embodiments, the global customization parameters also define usage rules. For example, how partial settlement instructions are processed. In certain embodiments, the Inventory Sourcing System 42 may be instructed to ensure that the whole settlement value is set aside for subsequent settlement.

In certain embodiments, the global customization parameters also define whether assets are to be shifted versus payment only or free of payment. For example, if the position manager module 72 receives a data message indicating that a particular user's assets will be transferred to another third party, the customization parameters may define whether the affected asset's are to be marked as reserved and thus unavailable upon receipt of a transaction confirmation message from the third party, or whether the transaction confirmation must comprise confirmation that the relevant funds have been reserved for the transaction by the third party before the affected assets are marked as unavailable.

In certain embodiments, the global customization parameters also define the minimum frequency with which the position manager module 72 is arranged to determine the status of a user's assets. For example, the global customization parameters may indicate that the position manager module 72 is to carry out the asset status review twice a day, or continuously, in response to receipt of asset status messages from the resource depository 44, 46. The specific frequency with which the position manager module 72 is arranged to operate and determine asset availability is further customizable by each user, provided that any user defined customization is compatible with the global customization parameters selected by the relevant resource depository 44, 46. In this regard, the global customization parameters demarcate the limits, within which further user customization is allowable.

Similarly, in certain embodiments, the global customization parameters also define the minimum frequency with which the inventory manager module 70 is arranged to determine and identify the qualifying assets, and maintain the qualifying subset of available assets. The specific frequency with which the inventory manager module 70 is arranged to operate may be further customised by each user.

In certain embodiments, the global customization parameters also define calculation rules, which calculation rules define how far in time asset status is to be determined. For example, the global customization parameters may define how far forward in time the position manager module 72 and/or the inventory manager module 70 are to determine asset status/availability. If an asset is scheduled to be sold in two days' time, and the global customization parameters indicate that asset status is to be determined up to two days in the future, then the position manager module 72 will update the mirrored asset database 50, and specifically the associated user's electronic balance sheet 76, to show that the asset is no longer available to the user. Similarly, if a user has acquired a new asset, and settlement is scheduled to be completed in two days' time, the position manager module 72 will update the user's electronic balance sheet 76 with the newly acquired asset, despite settlement not having yet taken place. The inventory manager module 70 will then determine if the newly added asset is available for use in any subsequent transactions. In such embodiments, the global customization parameters effectively define whether the affected asset is to be considered as comprised in the user's assets or not, for Inventory Sourcing System 42 purposes. In other words, and depending on the selected global customization parameters, the position manager module 72 can be configured to predict future asset availability based upon current asset status and known future obligations. In turn, the inventory manager module 70 can determine which assets qualify for inclusion in the qualifying subset of available assets based upon the predicted future asset availability positions.

In certain embodiments, the global customization parameters also define asset eligibility criteria. For example, each resource depository 44, 46 may define which types of assets are eligible for use with the Inventory Sourcing System 42. In addition or alternatively, each resource depository 44, 46 may define the characteristics of assets that are eligible for use with the Inventory Sourcing System 42. Asset eligibility criteria are further customizable by each user. In this regard, the resource depository defined asset eligibility criteria define threshold conditions that must be satisfied by all assets inventorised by the Inventory Sourcing System 42. Further user customization of the asset eligibility criteria is provided for.

Returning to FIG. 7, the global configuration parameters received from the resource depository 44, are stored at Step 104 in the mirrored asset database 50. All subsequently created user accounts associated with the specific resource depository 44, 46, must comply with the global configuration parameters received from the relevant resource depository 44, 46. Storing the global configuration parameters in the mirrored asset database 50 enables the controller 68 to ensure compliance with the received global configuration parameters. This effectively completes the resource depository registration process, and all remaining steps relate to user enrolment and account generation (e.g. electronic balance sheet generation).

A user account is generated at Step 105. The account is stored within the mirrored asset database 50 and is associated with the global configuration parameters of the specific resource depository 44, 46 that the account is associated with. In the event that the user account is associated with a plurality of resource depositories 44, 46, then the user account is associated with the global configuration parameters of all registered resource depositories.

The user account is configured at step 106 in accordance with the global configuration parameters of all registered resource depositories that the account is associated with.

A request for the user's configuration parameters is issued at Step 107. The user configuration parameters enable the user to further customise the previously provided global configuration parameters, and thereby further tailor the services provided by the Inventory Sourcing System 42 to the specific user. Further user customization is allowed, provided such customization is compatible with the previously provided global customization parameters. For example, the user may further customise the asset eligibility criteria, which may comprise defining a minimum to be left (MTBL) amount. The MTBL amount relates to the minimum amount of an asset that must remain in a user's account at all times. The MTBL amount may, in certain embodiments be associated with an asset category, instead of a specific asset, in which case the MTBL defines the minimum combined value of all assets that must remain in a user's account. Similarly, the user may define a maximum to be sourced (MTBS) amount, which relates to the maximum quantity of any one asset that the user is prepared to make available for use in a subsequent transaction. Both the MTBL and the MTBS parameters are relevant for the inventory manager module 70, and affect how the inventory manager module 70 operates. Customization parameters that affect operation of the inventory manager module 70 are stored in the preferences database 96.

The user may also define a sourcing sequence, which defines the sequence in which assets are made available for subsequent transactions by the inventory manager module 70. For example, the sourcing sequence defines the sequence in which assets are made available on the basis of asset type (e.g. mortgages, bonds, securities). The sourcing sequence is preferably stored in the preference database 96 within the inventory manager module 70. The sourcing sequence defines the order in which assets are selected from the subset of available assets by the collateralisation search engine 64 in a subsequent repo transaction.

Further types of user configuration parameters are envisaged however, for present purposes it suffices to appreciate that the user customization parameters may relate to any parameter which affects how the Inventory Sourcing System 42 operates, and specifically how the position manager module 72 and/or the inventory manager module 70 operate.

Once the user configuration parameters have been received, the inventory manager module 70 and the position manager module 72 are configured at Step 108 accordingly. Future operation of either the position manager module 72 or the inventory manager module 70 is dictated by the global configuration parameters and the user configuration parameters associated with the specific user account (e.g. the specific electronic balance sheet 76).

User resource depository account information is received at Step 109 by the Inventory Sourcing System 42. The received user resource depository account information is subsequently correlated at Step 110 with the user's mirrored asset database account, and/or where relevant with the specific user's electronic balance sheet 76. One or more resource depository accounts may be associated with each user's electronic balance sheet 76. Correlating each electronic balance sheet 76 with at least one resource depository account improves the functionality of the position manager module 72, since settlement instructions issued by the resource depositories are readily associable with the relevant electronic balance sheet 76 provided in the mirrored asset database 50. In this way, whenever a resource depository 44, forwards a copy of a settlement instruction, which will comprise the relevant user's resource depository account number, to the Inventory Sourcing System 42 for processing, the relevant user's electronic balance sheet 76 is readily identified and updated by the position manager module 72, on the basis of the resource depository account information provided in the settlement instructions. Advantageously, this means that once the relevant resource depository 44 and the relevant user have registered with the Inventory Sourcing System 42, the resource depository 44 does not need to further modify its existing procedures to effectively communication with the Inventory Sourcing System 42, and to ensure that the Inventory Sourcing System 42 provided with sufficient information to identify the relevant user's electronic balance sheet 76, and maintain an up-to-date image of the user's assets.

During the initial enrolment procedure, once the user's resource depository account information has been correlated at Step 110 with the user's Inventory Sourcing System account, a mirror image of the user's assets may be generated, e.g. the contents of the user's electronic balance sheet 76 may be generated. One way that this may be achieved is by the Inventory Sourcing System 42 requested a copy of the user's current electronic statement of financial standing from the one or more relevant resource depositories 44, 46. The one or more electronic statements are received at Step 111 and their contents is stored within the mirrored asset database 50, and where relevant information is used to populate the user's electronic balance sheet 76. Going forward, the position manager 72 updates and amends the content of the electronic balance sheet 76 upon receipt of asset status messages, to ensure that it is an up-to-date accurate, current reflection of the user's asset positions.

The user's inventory manager preferences are received at Step 112, and are stored within the inventory manager preference database 96. The user may select the inventory manager preferences on the operatively connected user terminal 62. The selected preferences are transmitted to the Inventory Sourcing System 42 via the shared communication network 60. The stored inventory manager preferences define the characteristics that assets must satisfy to qualify for inclusion in the qualifying subset of available assets generated by the inventory manager module 70.

During the initial enrolment process, once the user's inventory manager preferences have been received, the inventory manager module 70 carries out at Step 113 an optional trial run, to generate an initial qualifying subset of available assets that satisfy the user-defined inventory manager preferences. The result of the trial run—namely, the initially generated subset—is presented to the user at the user terminal 62. Confirmation that the result is acceptable, is requested at Step 114. Should the results not be acceptable, then Steps 112 to 114 are repeated until the user is satisfied with the generated qualifying subset of available assets. The mirrored asset database, and specifically the user's electronic balance sheet 76 is updated at Step 115 with the results of the inventory manager module 70 query, once the user has confirmed the results are satisfactory. In other words, the user's electronic balance sheet 76 is updated with the subset of the user's assets that satisfy the user-provided inventory manager preferences.

The enrolment process 100 is now complete at Step 116 and the Inventory Sourcing System 42 is configured to continuously monitor asset position movement (e.g. asset status updates), and the inventory manager module 70 is configured to ensure that the subset of available assets are maintained up-to-date. It is to be appreciated that Steps 113 and 114 are optional steps—in certain embodiments no trial run is carried out, and instead the inventory manager module 70 generates the qualifying subset of available assets directly on the basis of the received inventory manager preferences.

Once the mirrored asset database 50 has been configured with a user's electronic balance sheet 76, and the inventory manager preferences stored in the inventory manager module's preferences database 96, the Inventory Sourcing System 42 is ready to receive asset status data messages and to maintain the user's electronic balance sheet 76, and keep it up-to-date, in addition to maintaining the qualifying subset of available assets up-to-date.

FIG. 8 is a process flow chart of a position and inventory updating process 118. This figure shows how the Inventory Manager System 42 maintains both the mirrored asset database 74 and the qualifying subset of available assets, and keeps them up-to-date. The asset status message is received at Step 120 from a resource depository, such as the resource depository 44 illustrated in FIG. 2, by the communication module 66. As mentioned previously, in preferred embodiments the asset status message may relate to a copy of an asset settlement instruction message. For example, and for illustrative purposes, consider an asset, such as a security being transferred from a first user having an account with a first resource depository 44 to a second user having an account with a second resource depository 46, in exchange for transfer of a corresponding payment. Upon receipt of the payment, the first resource depository 44 generates settlement instructions, instructing a securities settlement entity (not illustrated in FIG. 2) to transfer the deed of title of the security in question to the second user having an account with the second resource depository 46. Preferably two copies of the securities settlement instruction are generated, with the first copy being forwarded to the relevant securities settlement entity and the second copy of the settlement instructions is forwarded to the Inventory Sourcing System 42.

Alternatively, rather than forwarding the settlement instructions, the transaction receipt generated by the relevant securities settlement entity is forwarded to the Inventory Sourcing System 42. It is to be appreciated that the securities settlement entity will generate a transaction receipt for both parties to the transaction. In other words, a transaction receipt is generated for the first resource depository 44, which confirms that ownership of the relevant security has been transferred to the second user having an account with the second resource depository 46. Similarly, a receipt is also generated for the second resource depository 46 confirming that ownership of the security has passed to the second user, and the second resource depository 46 is updated with the transferred asset. A copy of the transaction receipt may be forwarded at Step 120 of FIG. 8 to the Inventory Sourcing System 42, by the first or second resource depositories 44, 46.

For present purposes it is not relevant which of the above described options is implemented, suffice to appreciate that both options provide the Inventory Sourcing System 42 with the status of the asset in question. The asset status message is received at step 120 by the communication module 66, and specifically by the input module 78. The status message is forwarded to the harmonization module 80 where the message format is amended at Step 121 if required, into a format that is more readily processable by the position manager module 72. Once the message format has been amended, the formatted message is forwarded to the controller 68, which forwards the formatted status message on to the position manager module 72, and specifically to the position manager module 88. The position manager controller 88 forwards the formatted message to the next available processor 86 for processing. The formatted message is processed at Step 122 by an available processor 86, in order to generate at Step 123 an update instruction for processing by the mirrored asset database 74. The update instruction is forwarded to the instruction queue buffer 90, before being forwarded to the controller 68.

The controller 68 executes the update instruction, and updates at Step 124 the relevant user's account in the mirrored asset database 74 accordingly. In preferred embodiments, the relevant user's electronic balance sheet 76 is updated at Step 124 in accordance with the update instruction.

In parallel or at a later time, the inventory manager module 70, and specifically the inventory manager controller 92 queries the relevant user's mirrored asset database account, or as the case may be the relevant user's electronic balance sheet 76, in order to determine at Step 125 the available assets that satisfy the user provided inventory manager preferences. In certain embodiments, the inventory manager controller 92 restricts the query to the updated asset. In other words, the inventory manager controller 92 determines if the updated status of the asset is compliant with the user-defined inventory manager preferences. If the updated status is compliant, the asset is highlighted as being provided within the qualifying subset of assets, and the asset subset is updated at Step 126 accordingly. Otherwise the subset is not amended.

The Inventory Manager System 42 queries at Step 127 if any further status messages remain unprocessed. In particular, this comprises determining if any further status messages are present in the communication module's second message buffer 84, or if any further mirrored asset database instructions remain in the position manager's instruction queue buffer 90. If further messages remain, then Steps 122 to 127 are repeated until all messages have been processed, otherwise the process 118 is ended at Step 128.

In alternative embodiments, the variable processor architecture of the position manager module 72 may be implemented in software. For example, the position manager module 72 may comprise a single processor configured to execute a plurality of kernel processes in parallel. On the basis of the volume of incoming status update data messages, the processor can determine the number of kernel processes that are required to process the incoming status update data messages in real time.

The present embodiments can also be considered to extend to a computer-implemented method of improving the efficiency of an electronic collateralisation search engine that uses assets distributed on one or more remotely-located asset depositories, the method comprising: selecting from a database of asset records of the remotely-located assets of a collateral giver, a subset of asset records having asset characteristics that satisfy a collateral giver's one or more predefined threshold criteria; and restricting a received search for collateral giver's asset records which match a collateral receiver's query to the subset of collateral giver's asset records.

The method may further comprise receiving a data message from the one or more remotely located asset depositories, the data message comprising updated status information associated with one or more asset records; and updating the one or more asset records associated with the received data message, with the updated asset status information.

The updating step may be carried out on receipt of each data message or alternatively after a predetermined time period.

It is to be appreciated that the above described embodiments are exemplary only and that the skilled addressee will appreciate that many modifications may be made to the above examples without departing from the spirit and scope of the present invention as defined in the accompanying claims.

The invention claimed is:

1. A method of conducting an electronic collateralisation search, the method conducted by an asset inventory system and comprising:
   generating an image of asset records of a first party, the asset records being distributed on one or more remotely-located asset depositories;
   receiving, over a network, a first set of parameters from a user terminal, the first set of parameters indicating one or more predefined threshold criteria of the first party;
   storing the first set of parameters in the asset inventory system;
   filtering the image of asset records into a subset of asset records based on the stored first set of parameters;
   receiving, over the network, a search query from a third party collateralisation search engine to identify assets for use as collateral in a transaction between the first party and a second party, the search query comprising a second set of parameters indicating one or more criteria of the second party;
   restricting the search query to be executed on only the filtered subset of asset records;
   receiving, over the network, a data message from a given asset depository, the data message comprising an updated status of one or more asset records of the given asset depository;
   updating the image of asset records based on the received data message; and
   updating the subset of asset records based on the updated image of asset records and the stored set of parameters.

2. The method of claim 1, wherein the updating steps are carried out on receipt of the data message.

3. The method of claim 1, wherein the updating steps are carried out after a predetermined time period.

4. An asset inventory system for conducting an electronic collateralisation search, the system comprising:
   an image of a plurality of asset records, each asset record specifying an asset belonging to a first party and available to at least one remotely-located asset depository, wherein each specified asset comprises one or more variable asset characteristics associated with a status of the specified asset;
   a communication module arranged to receive a predefined set of qualifying characteristics from a user terminal over a network connection, the predefined set of qualifying characteristics indicating one or more predefined threshold criteria of the first party;
   a non-transitory storage medium arranged to store the predefined set of qualifying characteristics;
   a first processing module arranged to define a qualifying subset of the asset records by comparing the one or more variable asset characteristics of each asset record with the predefined set of qualifying characteristics and assigning any asset records which comprise the predefined qualifying characteristics to the qualifying subset;
   the communication module further arranged to receive a search query from a third party collateralisation search engine over the network connection, the search query indicating one or more criteria of a second party;
   a controller arranged to restrict the search query to be executed on only the qualifying subset of asset records;
   the communication module further arranged to receive a data message from one of the asset depositories over the network connection, the data message comprising current status information associated with updated variable asset characteristics of a given asset;
   a second processing module arranged to update the given asset in the image of asset records, with the updated variable asset characteristics;
   wherein the first processing module is arranged to determine whether the updated variable asset characteristics of the given asset in the asset record satisfy the predefined set of qualifying characteristics and to include the updated asset record in the qualifying subset when the updated variable asset characteristics of the updated asset record satisfy the predefined set of qualifying characteristics.

5. The asset inventory system of claim 4, wherein the first processing module is arranged to remove the updated asset record from the qualifying subset when the updated variable asset characteristics of the updated asset record do not satisfy the predefined set of qualifying characteristics.

6. The asset inventory system of claim 4, wherein the second processing module is arranged to generate a database record update instruction for updating the asset record associated with the given asset with the updated variable asset characteristics comprised in the received data message.

7. The asset inventory system of claim 6, wherein the second processing module comprises a variable kernel process architecture, each kernel process being arranged to generate the database record update instruction, and the second processing module is arranged to vary the number of kernel processes running in the second processing module, in order to vary the number of asset database update instructions generated in real-time, on the basis of the number of received data messages.

8. The asset inventory system of claim 7, wherein the second processing module comprises:
a plurality of processors arranged in parallel, each processor running a kernel process;
a second processing module controller for controlling operation of the plurality of processors; and wherein
the second processing module controller is arranged to determine and select the number of processors required to generate an asset database update instruction for each received data message in real-time, on the basis of the number of received data messages.

9. The asset inventory system of claim 4, wherein the first processing module comprises:
an instruction generator arranged to:
determine if the updated variable asset characteristics of the given asset in the asset record satisfy the predefined qualifying characteristics; and
generate a qualifying subset update instruction for updating the qualifying subset, the update instruction comprising instructions to include the updated asset record in the qualifying subset when the updated variable resource characteristics satisfy the predefined qualifying characteristics.

10. The asset inventory system of claim 4, wherein the second processing module is arranged to:
query one or more remotely-located asset depositories for one or more variable asset characteristics associated with a given asset available to the one or more remotely-located asset depositories;
generate an asset record within the asset database for the given asset; and
populate the asset record with the received one or more asset characteristics for the given asset.

11. The asset inventory system of claim 4, wherein the communication module is arranged to:
determine if the format of the received data message is compatible with the processing requirements of the second processing module; and
convert the format of the received data message into a format compatible with the processing requirements of the second processing module.

12. The asset inventory system of claim 4, wherein the data message from the at least one remotely-located asset depository comprises one or more global configuration parameters, the one or more global configuration parameters defining characteristics of subsequent data exchanges with the at least one remotely-located asset depository, and the communication module is configured to associate the received one or more configuration parameters with all asset records comprised in the asset database that are associated with asset available to the at least one remotely-located asset depository.

13. The asset inventory system of claim 4, wherein the communication module is arranged in independent hardware having an independent power source, and being operatively coupled to the asset database, the first processing module, the second processing module and the controller.

14. The asset inventory system of claim 4, wherein the first processing module is arranged to determine whether the updated variable asset characteristics of the given asset in the asset record satisfy the predefined set of qualifying assets after a predetermined period of time.

15. The asset inventory system of claim 4, wherein the first processing module is arranged to determine whether the updated variable asset characteristics of the given asset in the asset record satisfy the predefined set of qualifying characteristics upon each receipt of a data message.

16. The asset inventory system of claim 4, wherein the controller is arranged to output the qualifying subset of asset records to the external collateralisation search engine.

* * * * *